Patented Oct. 16, 1951

2,571,094

UNITED STATES PATENT OFFICE 2,571,094

ANTIFOULING COMPOSITION

Allen L. Alexander and Peter King, Washington, D. C.

No Drawing. Application September 12, 1942, Serial No. 458,168

10 Claims. (Cl. 260—738)

(Granted under the act of March 3, 1883, as amended April 30, 1928; 370 O. G. 757)

This invention relates to anti-fouling coating compositions for use on surfaces exposed to sea water. It is particularly directed to protective coatings for aluminum hulls such as are used on large flying boats, and to a method of applying the same.

Due to the fact that unprotected surfaces immersed in sea water soon acquire barnacles, moss and other debris, known as fouling of the surface, there has been a never ending search for coating materials which will prevent, or at least reduce, the fouling of surfaces coated therewith. The more effective of these materials have generally contained such toxicants as copper and mercury compounds, but none of the many known compositions has been satisfactory in all respects. Either the composition had too short a protective life or it did not greatly reduce the rate of fouling. An additional problem was introduced by the use of aluminum and its alloys for seaplane floats and hulls because the aluminum is badly attacked by many mercury compounds when they are present in sufficient concentration to prevent fouling. Also the protective coatings on aeroplane parts must be sufficiently abrasion resistant to last under the wear of fast take-offs and landings, and to offer a minimum of skin resistance.

This invention provides anti-fouling coating compositions which are characterized by unusual ability to prevent fouling of surfaces for periods of time considerably in excess of compositions known heretofore. The invention also contemplates a new combination of toxicants for use in such coating compositions which is superior to any prior known toxicants or combinations. In its preferred form the invention provides antifouling coverings particularly adapted for protection of aluminum surfaces, although they can be used equally well on other materials, and a method of applying these coverings to aluminum. The coating compositions (or coverings) resist the abrasion encountered on flying boat hulls while providing a hard smooth surface heretofore lacking in anti-fouling compositions, and they need be replaced or applied only after long periods of service.

The combination of toxicants which imparts the unique anti-fouling properties to the compositions of this invention consists of a mixture of calomel and copper resinate, the latter being the copper salts of pine rosin and well known commercially.

Calomel alone, when dispersed in an appropriate vehicle, reduces fouling to a considerable extent and has been widely used in anti-fouling coating materials. However, it does not prevent appreciable fouling, and the copper compounds are ineffective when used in vehicles hard enough to remain smooth under the abrasive action encountered on seaplane hulls and the like. Copper resinate alone is not effective as an antifouling agent and calomel in combination with other copper compounds does not appear to be appreciably better than without them. It is the combination of calomel and copper resinate which exhibits unique anti-fouling properties.

Calomel is one of the few mercury compounds which do not excessively attack aluminum, so that this combination of toxicants is particularly suited for preventing fouling on aluminum structures. It is obvious that the calomel should be substantially free from mercuric chloride or free mercury, if it is to be applied next to aluminum, because mercury and mercuric chloride are very corrosive. Even at best, however, the calomel will exert a deleterious effect on aluminum over a long period of time, and so to obtain complete protection it is advisable to apply a special sealing coat to the aluminum before application of the anti-fouling composition. This sealing coat is described further on.

Although the calomel and copper resinate may be incorporated in any of the vehicles commonly used in anti-fouling paints to obtain superior anti-fouling compositions, complete protection from fouling for long periods of time is obtained only when these toxicants are incorporated in vehicles which enhance their toxic effect on marine life and at the same time are capable of withstanding severe treatment. The preferred compositions of this invention, therefore, are identified by the combination of the above toxicants in certain vehicles which cooperate with the toxicants to provide coatings of extremely long anti-fouling and protective life.

Two vehicles of this class have been found to be (1) chlorinated rubber and (2) a mixture of an acrylic acid resin and a solvent soluble substituted phenolaldehyde condensation product, and there appears to be no relationship between the type of vehicle and its suitability for this purpose by which its selection can be made in advance of trial.

If the chlorinated rubber vehicle is selected the rubber should be of the rather highly chlorinated type, preferably containing at least about 60% combined chlorine by weight. The most useful chlorinated rubber also has a viscosity between about 100 and 250 centipoises (measured in 20% solution in toluol at 25° C.). Chlorinated rubber of extremely low or extremely high viscosity does not yield coatings having the extremely good anti-fouling properties of those made with chlorinated rubber within the above viscosity range. The highly chlorinated rubber is rather inelastic so that it is desirable to plasticize it for some uses. The plasticizer prolongs the time before checking of the anti-fouling film occurs. Any of the known plasticizers for chlorinated rubber may be employed. However it has been found that the alkyl esters of phthalic acid are particularly suitable and dibutyl phthalate is preferred.

If the mixed acrylic ester and phenol-aldehyde condensation product is selected best results will be obtained when a polymerized methacrylate ester, especially methyl methacrylate, is used in conjunction with the condensation product of formaldehyde and p-phenyl phenol. Other substituted phenols may be used, but unsubstituted phenolic resins have an undesirable effect on the toxicants. As in the case of the chlorinated rubber it may be desirable to plasticize the vehicle for certain uses, and for this purpose the same plasticizers may, in general, be used. In this case also, dibutyl phthalate has proven to be especially suitable.

The proportions of vehicle and toxicants which are to be used will be governed by the degree of protection desired and the severity of service. However the following general formula and examples will serve as guides to proper proportions where maximum anti-fouling action and durability are desired. In many cases the proportion of toxicant can be advantageously lessened.

*General formula*

5 to 25% calomel
2 to 12% copper resinate
6 to 20% vehicle
0 to 5% plasticizer
Balance pigment and solvent to suit.

*Example 1*

10.8 parts by weight calomel
13.7 parts by weight titanium dioxide
5.5 parts by weight zinc oxide
8.0 parts by weight chlorinated rubber (125 cps.)
5.4 parts by weight copper resinate (8% Cu by weight)
56.6 parts by weight xylol The above materials were ground together in a ball mill for 24 hours, after which time the mixture was homogeneous and ready for spraying.

*Example 2*

13.9 parts by weight calomel
17.0 parts by weight titanium dioxide
6.8 parts by weight zinc oxide
0.1 part by weight carbon black
9.9 parts by weight chlorinated rubber (125 cps.)
6.8 parts by weight copper resinate (8% Cu by weight)
42.2 parts by weight xylol
3.3 parts by weight dibutyl phthalate The above materials were ground together as in Example 1. Due to the presence of the dibutyl phthalate the panels coated with this composition showed greater check resistance over similar periods of time, but in all other respects the compositions of Examples 1 and 2 were alike.

*Example 3*

50.0 parts by weight methyl methacrylate resin dissolved in Cellosolve acetate (30% solid; visc. at 30° C. 53–58 sec. 50 gm. wt. Stormer)
7.5 parts by weight p-phenyl-phenol-formaldehyde resin solution (50% in butyl acetate)
3.0 parts by weight dibutyl phthalate
7.0 parts by weight ethoxy-ethyl acetate (Cellosolve acetate)
18.5 parts by weight calomel
9.4 parts by weight copper resinate (8% Cu by wt.)
14.0 parts by weight titanium dioxide
5.0 parts by weight diatomaceous earth.
0.1 part by weight carbon black The above materials were ground together as in Example 1. Panels coated therewith showed the composition to have anti-fouling and protective properties similar to the material of Example 2.

Where the above anti-fouling coating compositions were applied over aluminum it was found advisable to prepare the aluminum surface before applying the anti-fouling composition, in order to obtain maximum protection against corrosion. The aluminum was anodized and coated with a zinc chromate primer according to standard practice. Then a sealing coat was applied over the primer and the anti-fouling composition was applied as a top coat. The primer is employed as a practical matter because in actual use it is impossible to prevent the protective coating from being scratched through in a few places such as occurs to some extent when a seaplane is beached. Since the primer is porous the sealing coat was applied to protect the metal from the action of the calomel in the anti-fouling composition. Almost any impervious material may be used for the sealing coat provided it has sufficient adhesion to the anti-fouling composition. A particularly suitable sealing material was found to be a mixture of chlorinated rubber and an alkyd resin, and such a mixture was applied to the aluminum test panels which were coated with the compositions described in each of the above examples.

Obviously the sealing coat is not necessary on surfaces not attacked by mercury salts, and in tests where the anti-fouling compositions of this invention were used on wood the sealing coat was omitted entirely with no change in protective or anti-fouling properties.

In place of zinc oxide and titanium dioxide other pigments may be used or where hiding power is not important they may be omitted entirely. Similarly other coloring materials may be substituted for the carbon black of the examples, and the composition tinted to suit the eye.

It is obvious that the vehicle need not be all chlorinated rubber or mixed acrylic ester and phenol-aldehyde, but it is necessary that one of these two vehicles constitute the major part, and preferably be substantially all, if the greatest benefits of the invention are to be realized.

Other toxicants can be added provided the composition contains both calomel and copper resinate in appreciable amount. The amount of copper resinate to be employed will depend on the percent copper in the material. As is indicated in the examples, the foregoing proportions are based on a copper content of about 8% copper by weight in the resinate.

Many variations will be apparent to those skilled in the art, and the invention should not be limited other than as defined by the appended claims.

The invention described herein may be manufactured and used by or for the Government of the United States of America for governmental purposes without the payment of any royalties thereon or therefor.

We claim:

1. An antifouling composition comprising about 5 to 25% calomel, about 2 to 12% copper resinate and about 6 to 20% of a compatible resinous film-forming vehicle comprising chlorinated rubber.

2. An antifouling composition as defined in claim 1, wherein the calomel and the copper resinate are present in the weight ratio of about 2:1.

3. An antifouling composition as defined in claim 2, wherein the chlorinated rubber is present in the weight ratio of about 1:2 on the combined weight of the calomel and copper resinate.

4. An antifouling composition as defined in claim 1, wherein the chlorinated rubber has a viscosity within the range of about 100 to 250 centipoises.

5. An antifouling composition comprising about 5 to 25% calomel, about 2 to 12% copper resinate and about 6 to 20% of a compatible resinous film-forming vehicle comprising chlorinated rubber which contains at least about 60% combined chlorine by weight and has a viscosity within the range of about 100 to 250 centipoises.

6. An antifouling composition as defined in claim 5, wherein the calomel and copper resinate are present in a weight ratio of about 2:1.

7. An antifouling composition as defined in claim 5, wherein the chlorinated rubber is plasticized with a dialkyl phthalate.

8. An antifouling composition as defined in claim 6 wherein the chlorinated rubber is present in the weight ratio of about 1:2 on the combined weight of the calomel and copper resinate.

9. An antifouling composition comprising about 5 to 25% calomel, about 2 to 12% copper resinate and about 6 to 20% of a compatible resinous film-forming vehicle selected from the group consisting of chlorinated rubber and an admixture of polymethyl methacrylate with a phenylphenol-formaldehyde resin.

10. An antifouling composition as defined in claim 9, wherein the resinous film-forming vehicle comprises an admixture of polymethyl methacrylate with a p-phenylphenol-formaldehyde resin.

ALLEN L. ALEXANDER.
PETER KING.

REFERENCES CITED

The following references are of record in the file of this patent:

UNITED STATES PATENTS

| Number | Name | Date |
| --- | --- | --- |
| 488,479 | Munson | Dec. 20, 1892 |
| 2,069,983 | Ubben | Feb. 9, 1937 |
| 2,287,218 | Young | June 23, 1942 |

OTHER REFERENCES

Circular 259 Scientific Section, Paint Mfrs. Asso. of U. S., pages 240, 245, 247, 248, 255, 256, 257, 264 and 268, published January 1926.

Krumbhaar, article on pages 629, 630 and 631 of India Rubber Journal, June 3, 1933.